US009342691B2

(12) United States Patent
Maestas

(10) Patent No.: US 9,342,691 B2
(45) Date of Patent: May 17, 2016

(54) INTERNET PROTOCOL THREAT PREVENTION

(71) Applicant: TechGuard Security, L.L.C., Lake St. Louis, MO (US)

(72) Inventor: David Edward Maestas, Lake St. Louis, MO (US)

(73) Assignee: Bandura, LLC, Catonsville, MD (US)

( * ) Notice: Subject to any disclaimer, the term of this patent is extended or adjusted under 35 U.S.C. 154(b) by 64 days.

(21) Appl. No.: 14/208,998

(22) Filed: Mar. 13, 2014

(65) Prior Publication Data

US 2014/0283085 A1    Sep. 18, 2014

Related U.S. Application Data

(60) Provisional application No. 61/782,669, filed on Sep. 14, 2013.

(51) Int. Cl.
*H04L 29/06* (2006.01)
*G06F 21/55* (2013.01)
*G06F 21/57* (2013.01)

(52) U.S. Cl.
CPC ............ *G06F 21/554* (2013.01); *G06F 21/577* (2013.01); *H04L 63/0236* (2013.01); *H04L 63/0263* (2013.01); *H04L 63/1408* (2013.01); *G06F 2221/2111* (2013.01); *G06F 2221/2119* (2013.01)

(58) Field of Classification Search
CPC .............................. G06F 21/577; H04L 63/14
See application file for complete search history.

(56) References Cited

U.S. PATENT DOCUMENTS

| | | |
|---|---|---|
| 6,754,662 B1 | 6/2004 | Li |
| 7,369,557 B1 | 5/2008 | Sinha |
| 7,602,785 B2 | 10/2009 | Dharmapurikar et al. |
| 7,779,143 B2 | 8/2010 | Bu et al. |
| 7,849,146 B2 | 12/2010 | Choi et al. |
| 7,904,642 B1 | 3/2011 | Gupta et al. |
| 7,996,348 B2 | 8/2011 | Pandya |
| 8,018,940 B2 | 9/2011 | Hao et al. |
| 8,272,044 B2 | 9/2012 | Ansari et al. |
| 8,559,434 B2 | 10/2013 | Esteve Rothenberg et al. |
| 8,589,503 B2 | 11/2013 | Alperovitch et al. |

(Continued)

OTHER PUBLICATIONS

Dharmapurikar, Sarang et al. "Fast Packet Classification Using Bloom Filters," ACM/IEEE Symposium on Architecture for Networking and Computing Systems, Dec. 5, 2006, pp. 61-70.

Kumar, A. et al. "Space-Code Bloom Filter for Efficient Per-Flow Traffic Measurement," IEEE Journal on Selected Areas in Communications, vol. 24, Issue 12, Dec. 2006, pp. 2327-2339.

(Continued)

*Primary Examiner* — Mahfuzur Rahman
(74) *Attorney, Agent, or Firm* — Senniger Powers LLP

(57) ABSTRACT

Blocking high-risk IP connections in real-time while allowing tailoring of an acceptable risk profile to match the security requirements of network resources. By acquiring IP threat information about IP addresses, including risk confidence levels, assigning weighting factor values corresponding to various characteristics of the IP addresses, and mathematically transforming the risk confidence levels using the weighting factor values, traffic from IP addresses posing unacceptable levels of risk is blocked. Further, mathematically transforming risk confidence level to a user-defined acceptable risk level permits allowing traffic from the IP addresses having an acceptable level of risk.

19 Claims, 13 Drawing Sheets

(56) References Cited

U.S. PATENT DOCUMENTS

| | | | |
|---|---|---|---|
| 8,782,157 B1* | 7/2014 | Hansen | 709/206 |
| 8,881,277 B2 | 11/2014 | Kay | |
| 2002/0099691 A1 | 7/2002 | Lore et al. | |
| 2003/0163445 A1 | 8/2003 | Oza et al. | |
| 2004/0019477 A1 | 1/2004 | Finkelstein | |
| 2004/0128355 A1 | 7/2004 | Chao et al. | |
| 2004/0230696 A1 | 11/2004 | Barach et al. | |
| 2005/0204404 A1* | 9/2005 | Hrabik et al. | 726/22 |
| 2007/0061458 A1 | 3/2007 | Lum | |
| 2008/0010678 A1 | 1/2008 | Burdette et al. | |
| 2010/0269168 A1* | 10/2010 | Hegli et al. | 726/11 |
| 2012/0167210 A1 | 6/2012 | Oro Garcia et al. | |

OTHER PUBLICATIONS

Song, Haoyu et al. "Fast Hash Table Lookup Using Extended Bloom Filter: An Aid to Network Processing," Proceedings of the 2005 Conference on Applications, Technologies, Architectures, and Protocols for Computer Communications, ACM SIGCOMM, vol. 35, Issue 4, Oct. 2005, pp. 181-192.

Song, Haoyu et al. "IPv6 Lookups using Distributed and Load Balanced Bloom Filters for 100Gbps Core Router Line Cards," IEEE Infocom, Apr. 25, 2009, pp. 2518-2526.

Pankaj Gupta et al: "Algorithms for Packet Classification", IEEE Network, IEEE Service Center, New York, NY, US, vol. 15, No. 2, Mar. 1, 2001, pp. 24-32, XP011092081, ISSN: 0890-8044, 10 pgs.

* cited by examiner

INTERNET PROTOCOL THREAT PREVENTION

CROSS-REFERENCE TO RELATED APPLICATION

This application claims the benefit of U.S. Provisional Application Ser. No. 61/782,669, filed Mar. 14, 2013, the entire disclosure of which is incorporated herein by reference for all purposes.

BACKGROUND

Computing devices connected to the Internet face constant security risks. Computer services connected to the Internet, especially public-facing services, face attacks designed to deprive access to the resource (i.e., denial of service), disrupt access to the resource (e.g., to make political statements), or provide illegal access to the resource (e.g., for monetary reasons). Internet-connected devices inside the firewall of a protected network are at risk when communicating with resources outside the firewall. These devices inside the firewall may become infected with malware that attempts to enlist them in a bot-net or that attempts to send personal and/or financial information to unauthorized entities on the Internet.

At one time, adding access rules into a firewall to restrict inbound or outbound Internet connections addressed this problem. However, today's hackers and cyber-criminals are much more sophisticated and are able to hide their identities by connecting through proxies, anonymizers, and computers that have been enlisted into a bot-net controlled by the attacker. Simply blocking an Internet Protocol (IP) address is insufficient to prevent attacks because the IP addresses used by attackers can change daily, hourly, and sometimes even more frequently. Further, having only two options (i.e., blocked or not blocked) does not provide adequate flexibility for assessing threats. And creating exceptions is manually intensive.

An Internet Risk Intelligence Provider (IRIP) is an entity that monitors Internet network nodes for signs of malicious activity and provides access to its findings. Upon detecting possibly malicious activity, an IRIP adds the IP address associated with the activity to a downloadable list or a real-time feed. Along with the IP address, the IRIP includes the risk category of the potential risk and a confidence score, which indicates the probability that the detected IP address is actually a risk. A typical IRIP is capable of monitoring millions of IP addresses and, thus, a typical list of IP addresses may number in the millions. Unfortunately, conventional firewalls and routers normally used to stop high-risk IP addresses from connecting into or out of a network are capable of blocking only a small percentage of the IP addresses. (e.g., 10,000 up to 100,000 IP addresses). In addition to the disadvantages described above, firewalls and routers also require the access rules that determine which IP addresses will be blocked (i.e., risk blocking) to be constantly updated in real-time as the threat environment changes. What is needed is a practical way to block high-risk IP connections in real-time while allowing users to tailor their acceptable risk profiles to match the security requirements of their network resources.

SUMMARY

Briefly, aspects of the invention permit blocking high-risk IP connections in real-time while allowing users to tailor their acceptable risk profiles to match the security requirements of their network resources. IP threat information is acquired from one or more providers via a feed (e.g., based on eXtensible Markup Language (XML) or JavaScript Object Notation (JSON)). The information includes, for example, an IP address, a named risk category, and a confidence level that the listed IP address is actually a threat within the named category. Advantageously, the category names from each provider are mapped into a set of common category names to resolve potential naming conflicts. An aggregate risk score based on the individual risk scores takes into account confidence levels assigned by IRIPs, the number of times an IP address has been listed as high-risk over a predefined time interval, and the time interval since the last time the IP address was listed. In addition, weighting the scores from the IRIP data improves threat assessment.

In an aspect, a computer-implemented method of assessing a risk associated with an IP address for a risk category comprises storing a plurality of threat information in a memory device. The threat information includes the IP address, a risk category associated with the IP address, and a risk confidence level associated with the IP address. In addition, the method comprises storing a risk category acceptance level in the memory device and determining a risk category value associated with the IP address. According to the method, the risk category value is determined as a function of the risk confidence level, a number of instances the risk confidence level has exceeded the risk category acceptance level during a first time interval, and a second time interval representing the elapsed time since the risk confidence level previously exceeded the risk category acceptance level. The method further comprises storing the risk category value in the memory device and rendering a decision as to the threat associated with the IP address for the risk category as a function of the risk category value and the risk category acceptance level.

In another aspect, a processor-implemented method of determining an aggregate risk score for a plurality of IP address comprises receiving a plurality of IP addresses from one or more IRIPs for a particular category via a computer communications network. In addition, the method includes determining source characteristics for each of the received IP addresses, and assigning weighting factors to the source characteristics, and mathematically transforming the weighted source characteristics to adjust a risk confidence level for each of the received IP addresses. The method further comprises determining an aggregate risk score for the IP addresses based on the adjusted confidence levels for the IP addresses and allowing traffic from each of the IP addresses having an aggregate risk score below an acceptable level of risk.

In yet another aspect, a system for determining risk for a plurality of IP addresses received in real-time from a plurality of sources comprises a memory for storing a plurality of IP addresses and a date and a time, an assigned risk category, and a confidence level for each IP address. A graphical user interface displays a plurality of categories associated with each IP address and accepts input, including an acceptable risk level for each of the plurality of categories, from a user. The system also includes a computer processor for executing computer-executable instructions for receiving a plurality of IP addresses from one or more IRIPs for a particular category, determining if the one or more received IP addresses are associated with more than one category, determining source characteristics for each of the received IP addresses for a category, assigning a weighting factor to each of the source characteristics for each category, adjusting a confidence level for each of the received IP addresses by using a mathematical transform based on the weighting factors for each category, determining an aggregate risk score for all the IP addresses based on the adjusted confidence levels, receiving an acceptable risk level from a user for each category, comparing the aggregate risk score with the received acceptable risk level from the user, and allowing any IP addresses having an aggregate risk score below the acceptable risk level to pass through the network's firewall.

In yet another aspect, a computer network firewall system comprises at least one tangible, non-transitory a computer-readable medium storing processor-executable instructions. A threat assessment processor is programmed to execute the instructions. And, when executed by the processor, the instructions store a plurality of threat information on the computer-readable medium. The threat information includes an IP address, a risk category associated with the IP address, and a risk confidence level associated with the IP address. In addition, the executed instructions store a risk acceptance level and determine a risk value associated with the IP address as a function of the risk confidence level, a number of instances the risk confidence level has exceeded a threshold level during a first time interval, and a second time interval representing the elapsed time since the risk confidence level previously exceeded the threshold level. The executed instruction further compare the risk value with the risk acceptance level and block computer network communications with a computing device associated with the IP address when the risk value is greater than or equal to the risk acceptance level.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the invention permit blocking high-risk IP connections in real-time based on IP threat information while allowing users to tailor their acceptable risk profiles to match the security requirements of their network resources. IP threat information provides details relating to potentially high-risk IP addresses. This information includes, at least in part, an IP address, a named risk category, and a risk score corresponding to a confidence level that the associated IP address is actually a threat within the named category. It is contemplated that additional information relating to the IP address may be included. In an embodiment, IP threat information is acquired from one or more providers (e.g., IRIPs) via a real-time feed based on an encoding format, such as XML or JSON, across a communications network. In another embodiment, IP threat information is acquired from a computer-readable storage medium.

Figure 1:
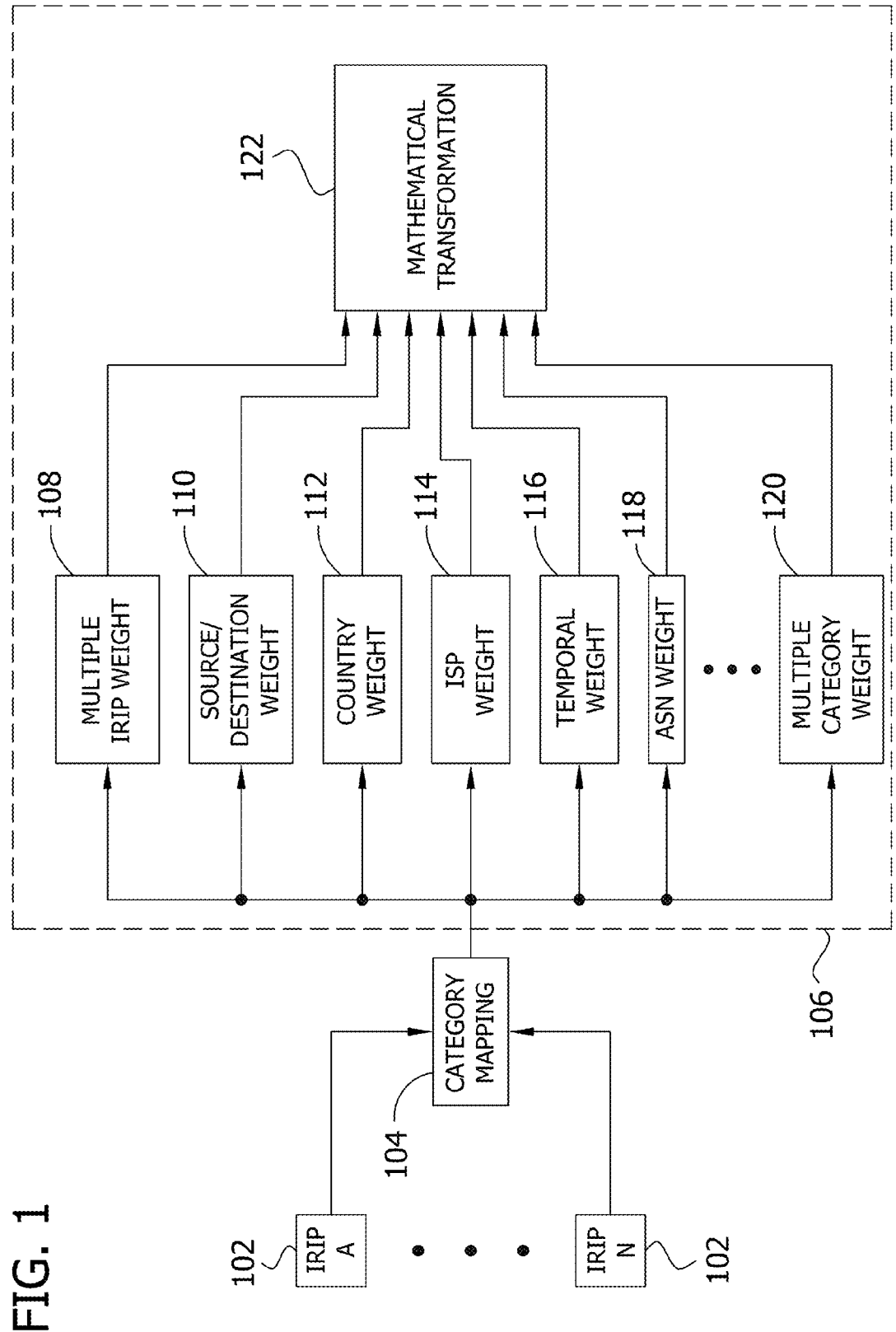
FIG. 1 is a diagram of an exemplary threat assessment process in accordance with an embodiment of the invention.

FIG. 1 illustrates a process for assessing threats embodying aspects of the present invention. In accordance with aspects of the present invention, the process assigns weights to various characteristics associated with an IP address and adjusts a risk score for the IP address by using a mathematical transformation.

In an embodiment of the present invention, the risk category names are mapped into a set of common category names. As shown in FIG. 1, IP threat information is acquired from a plurality of IRIPs 102 and the named risk category provided by each IRIP is mapped into a common category name at 104. For example, attackers commonly hide their identities on the Internet through the use anonymous proxies (i.e., anonymizers), which makes Internet activity untraceable. Different IRIPs may label an IP address associated with a named risk category differently, depending upon individual naming conventions. For example, different IRIPs may label an IP address from an anonymizer as a "Tor Node," a "Tor Exit Node," or a "Tor Anonymizing Node." To create a common taxonomy, each of the IRIP category names are mapped to a common category name, for example, a "Tor node." As another example, IRIPs may use category names such as "Anonymizer node," "Proxy node," and "Relay node," which could be mapped to "Proxy node." Mapping the different category names from different IRIPs into one common category avoids problems with naming conventions or spelling issues within a given category. Exemplary categories may include, but are not limited to "Command and Control Sever," "Known Infected Bot," "Known spam Source," "Tor Node," "Known Compromised or Hostile Host," "Proxy Host," "Host Performing Scanning," "SSH or other brute forcer," "Fake AV and AS products," "Distributed Command and Control Nodes," "Suspicious exe or dropper service," "Mobile CnC," and "Mobile Spyware Cnc."

Preferably, the IP threat information mapped at 104 is stored in a local database. In an embodiment, a timestamp (e.g., the date and time) of acquisition of the IP threat information is stored in the local database with the IP threat information. The date and time may be used for aging out entries. As time passes without additional information about a particular IP address, the certainty of that particular IP address being a high risk diminishes. For example, an IRIP may list a particular IP address as a high risk consistently over a predetermined period of time. That particular high-risk IP address may warrant an assignment of a higher weighting value compared to other high-risk IP addresses that are not consistently ranked as a high risk.

Referring further to FIG. 1, a Risk Assessment Mitigation Processor (RAMP) engine 106 assigns weights for various characteristics associated with the IP address. Exemplary characteristics for which weights are assigned include, but are not limited to, multiple IRIP characteristics 108, source and/or destination characteristics 110, originating country characteristics 112, originating ISP characteristics 114, temporal characteristics 116, an autonomous system number (ASN) characteristics 118, and multiple category characteristics 120. As explained in greater detail below, after the various weighting factors have been assigned to the IP address, the weighted values are then used by a mathematical transform 122 (e.g., a linear transform, an exponential transform, or a logarithmic transform) to apply an adjustment to the risk score. Based on one or more of the weighted risk category values, aspects of the invention render a decision or otherwise determine an action. Exemplary actions include a decision to allow traffic, re-route the traffic, allow the traffic but make a record of it, etc.

Figure 2:
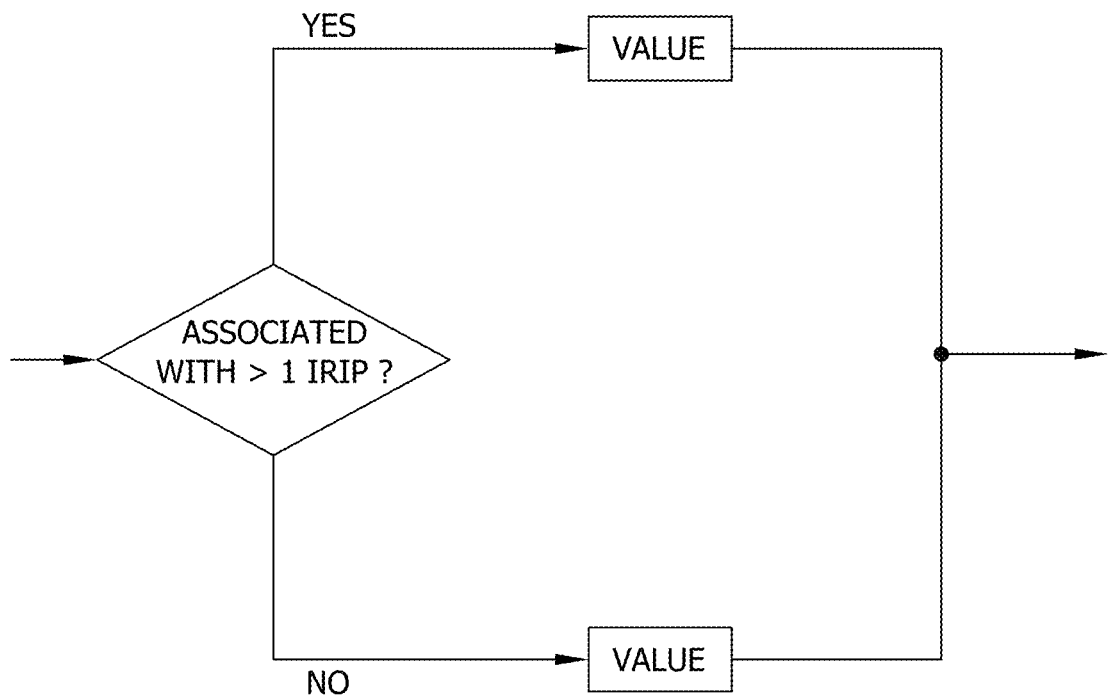
FIG. 2 further illustrates an exemplary weighting process for multiple IRIP characteristics of FIG. 1.

FIG. 2 further illustrates the weighting process for multiple IRIP characteristics 108. In an embodiment, each IP address that is acquired from multiple IRIPs is assigned a weighting factor value that has a greater weighting factor value compared to a weighting factor value assigned to an IP address associated with a single IRIP.

Figure 3:
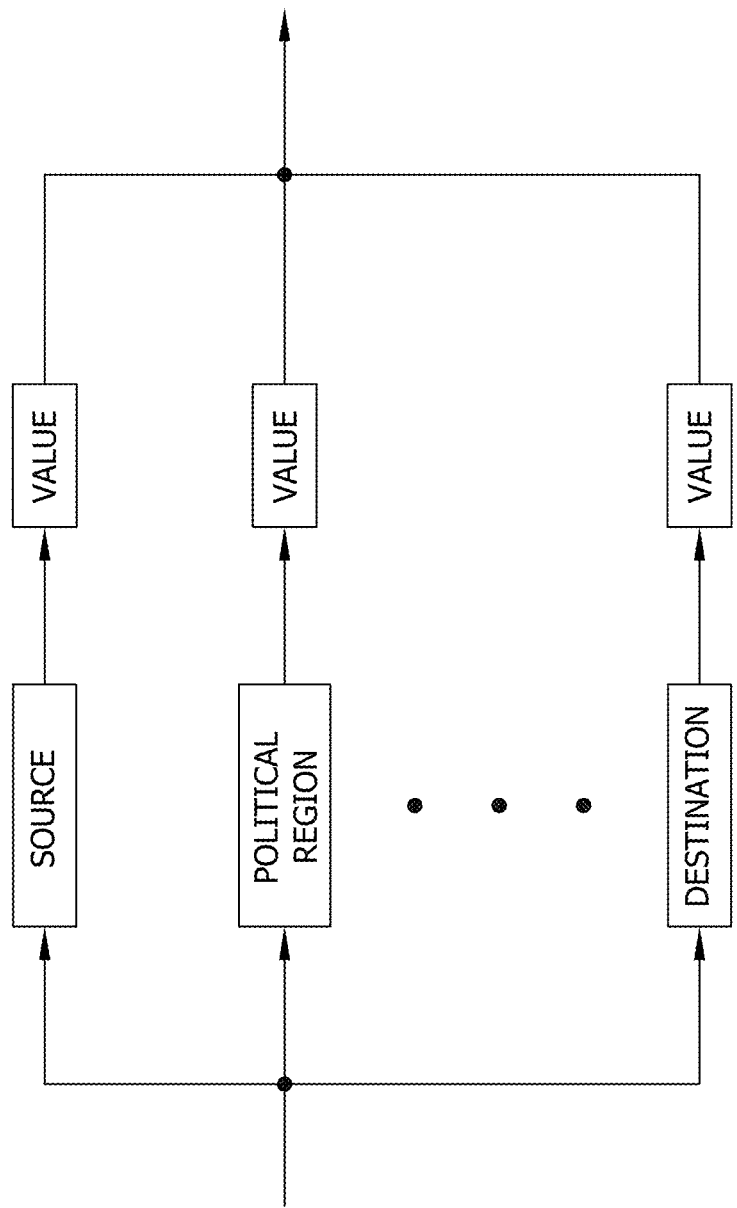
FIG. 3 further illustrates an exemplary weighting process for source and/or destination characteristics of FIG. 1.

FIG. 3 further illustrates the weighting process for source and/or destination characteristics 110. A weighting factor in this embodiment is applied to take into account the risk associated with connections to IP addresses originating (i.e., inbound or source) or going to (i.e., outbound or destination) certain regions. Examples of regions include, but are not limited to geographical areas, such as countries, business sectors, political divisions, and the like. For instance, an IP address originating in China may have a higher risk than an IP address originating in Canada. In addition, an IP address from a regulated industry, such as financial or critical infrastructure, may be less likely to pose a risk than an IP address from, for example, the entertainment or real-estate industry. Further, connections from a political group that strongly supports pornography or other unfavorable subjects would be more likely to be the target of an attack by cyber activists, and would be more likely to be infected than an IP address from a political group that supports religious freedom or other favorable subjects.

The weighting process of FIG. 3 combines source and/or destination weight with the risk score provided by each IRIP provider to derive a weighted risk score that takes into account where the connection originates from (inbound) or terminates at (outbound). In the outbound (i.e., destination) case, for example, malware may be resident on a computer and running unnoticed in the background. When the malware sends information to an IP address, the risk score of the destination IP address is compared against the established acceptable level and the connection is dropped if the score exceeds the maximum acceptable risk level.

Moreover, in an embodiment the source and/or destination weighting factor takes into account geographic proximity instead of or in addition to country filtering. Geographic proximity relates to how close the IP address is to other IP addresses that are listed as high-risk. This method is not the same as country filtering, although there may be some overlap between the two methods. This technique uses mathematical formulas to determine the proximity of a potentially high-risk IP address to the nearest cluster of high risk IP addresses. The distance to the cluster is combined with the weighted threat score of the cluster to determine the risk for the IP address not associated with the cluster. The closer the IP address is to the cluster, the higher the risk score assigned to the IP address. Beneficially, this geographic proximity method provides better results when the cluster and the IP address are close in proximity, but in different countries, such as near the border. For example, an IP address located 10 miles from Blaine, Wash., could be associated with clusters located in neighboring cities such as Seattle, Wash., United States or Vancouver, British Columbia, Canada. If the cluster is located in Seattle and the IP address is located in White Rock, British Columbia, Canada, it would not be listed as a threat when a country filter (e.g., the United States) is utilized. However, by using geographic proximity, the existence of the United States-Canada border between the cluster and the IP address is irrelevant and the IP address would be a higher threat risk given its proximity to the cluster located in Seattle.

Figure 4:
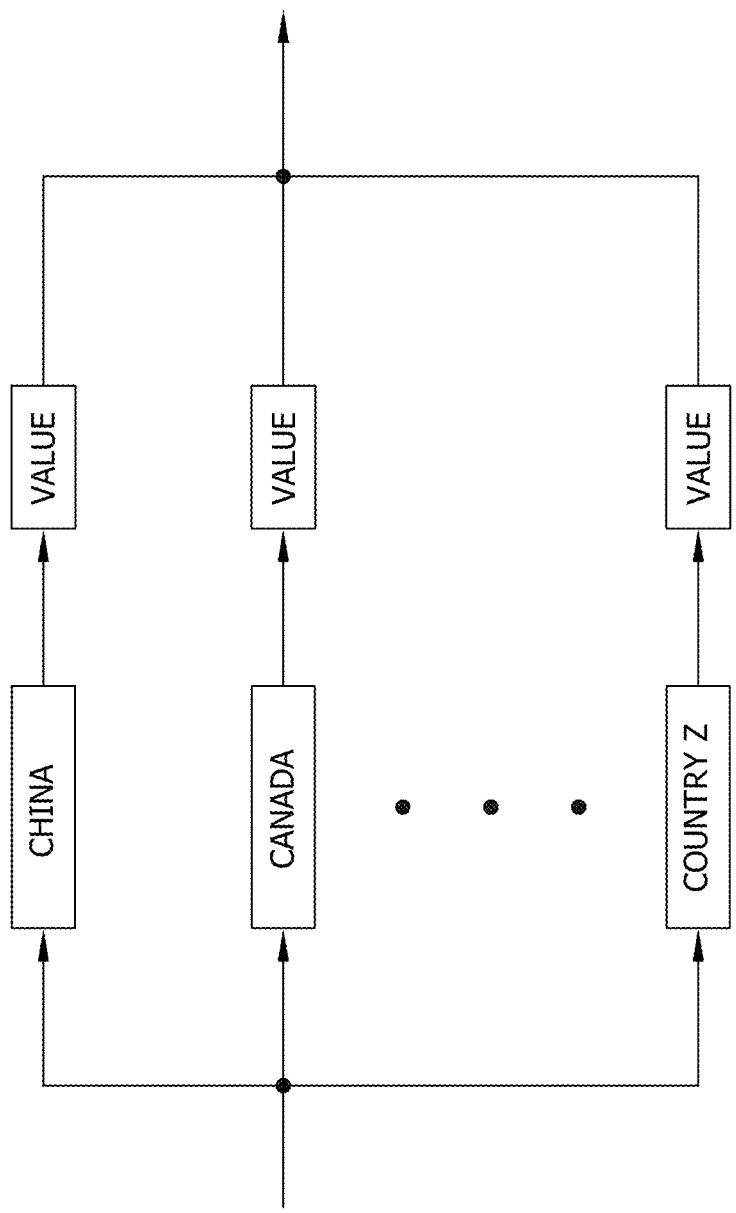
FIG. 4 further illustrates an exemplary weighting process for originating country characteristics of FIG. 1.

FIG. 4 illustrates the weighting process for originating country characteristics 112 according to an embodiment of the invention. For instance, in assigning a weight to an IP address originating from a particular country, the RAMP engine 106 assigns a greater weighted value to an IP address originating from a higher risk country, such as China, compared to an IP address originating from a lower risk country, such as Canada.

Figure 5:
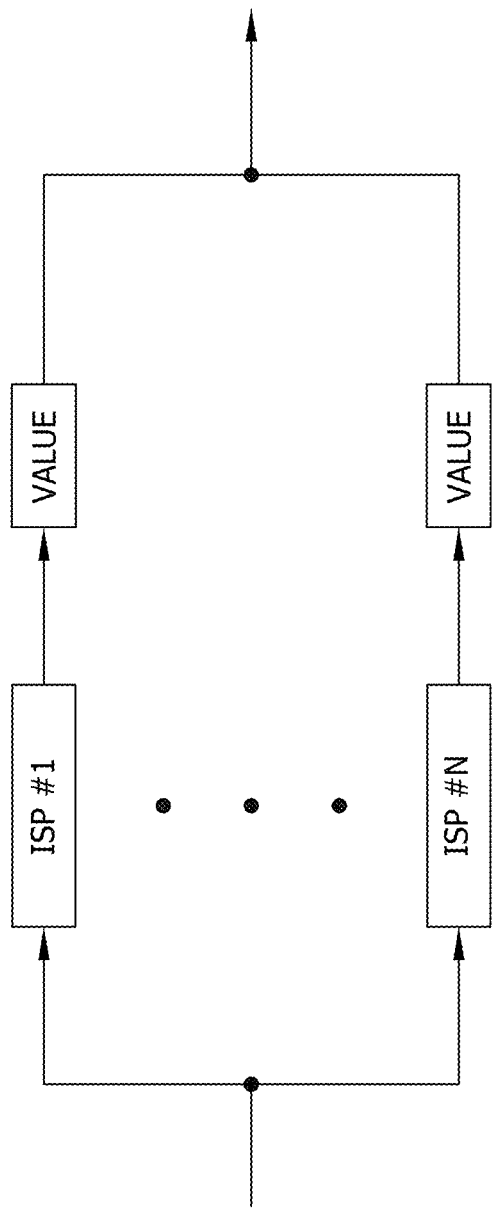
FIG. 5 further illustrates an exemplary weighting process for originating ISP characteristics of FIG. 1.

In FIG. 5, the weighting process for originating ISP characteristics 114 embodying aspects of the invention considers the ISP's threat experience. For example, RAMP 106 may take into account the risk associated with connections originating from a particular ISP that has a high number of IP addresses that consistently appear on IP threat feeds, which indicates that the ISP does not enforce adequate restrictions preventing its IP address space from being used for a malicious purpose. Therefore, the ISP is weighted according to, for example, its reliability to assess a particular IP address as a threat.

Figure 6:
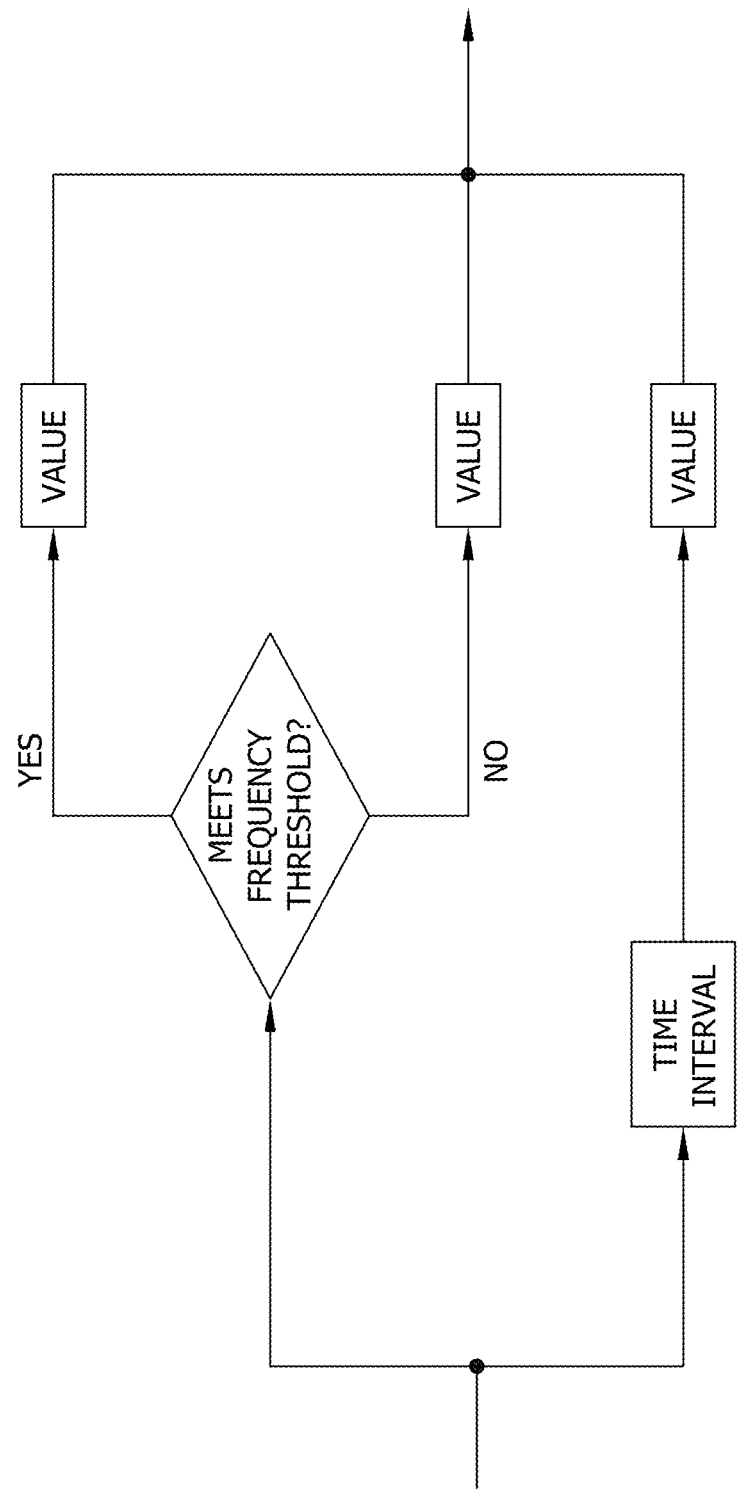
FIG. 6 further illustrates an exemplary weighting process for temporal characteristics of FIG. 1.

FIG. 6 further illustrates the weighting process for temporal characteristics 116. In an embodiment, RAMP engine 106 determines how often the IP address in question has been listed as a high risk over a predefined time interval and compares that number to a predefined threshold value. When the number of times the IP address has been listed as high-risk over the time interval exceeds the threshold value, a frequent weighting value $w_1, w_2, \ldots, w_n$ is assigned to the risk score, where $w_i > 0$ and $w_i < 2$, yielding ±100%. When the number of times the IP address has been listed as high-risk over the time interval does not exceed the threshold value a "not frequent" weighting value is assigned to the risk score. In another embodiment, RAMP engine 106 determines the time interval since the IP address was previously listed as being a high risk. A time interval weighting value is assigned to the risk score that is proportional to the determined time interval.

Figure 7:
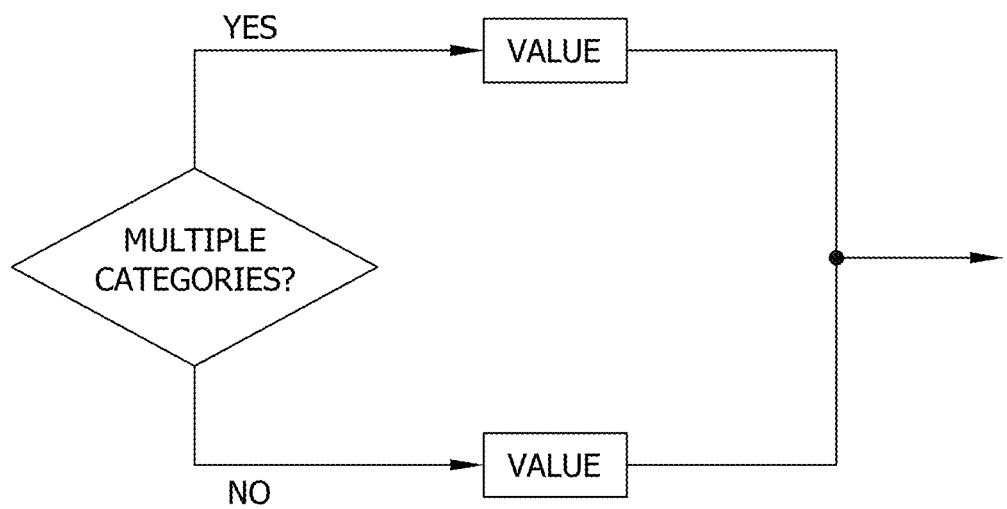
FIG. 7 further illustrates an exemplary weighting process for multiple category characteristics of FIG. 1.

Referring now to FIG. 7, a plurality of IRIPs may list a certain IP address in more than one named risk category. The exemplary weighting process for multiple category characteristics 120 accounts for this situation. For example, one IRIP may list a particular IP address as spam, whereas another IRIP may list the same IP address as both spam and a Tor Exit Node. In an embodiment, RAMP engine 106 determines whether the IP address is listed in more than one named risk category and assigns a "multiple" weighting value when it is listed in more than one category and assigns a "not multiple" weighting value when it is not listed in more than one category. Further, the RAMP engine may assign a multiple category weighting value that is proportional to the number of named risk categories in which the IP address has been listed.

Referring again to the embodiment illustrated by FIG. 1, after the various weighting factors have been assigned to the IP address, the weighted values are then used by the mathematical transform 122 (e.g., a linear transform, an exponential transform, or a logarithmic transform) to apply an adjustment to the risk score.

Figure 8A:
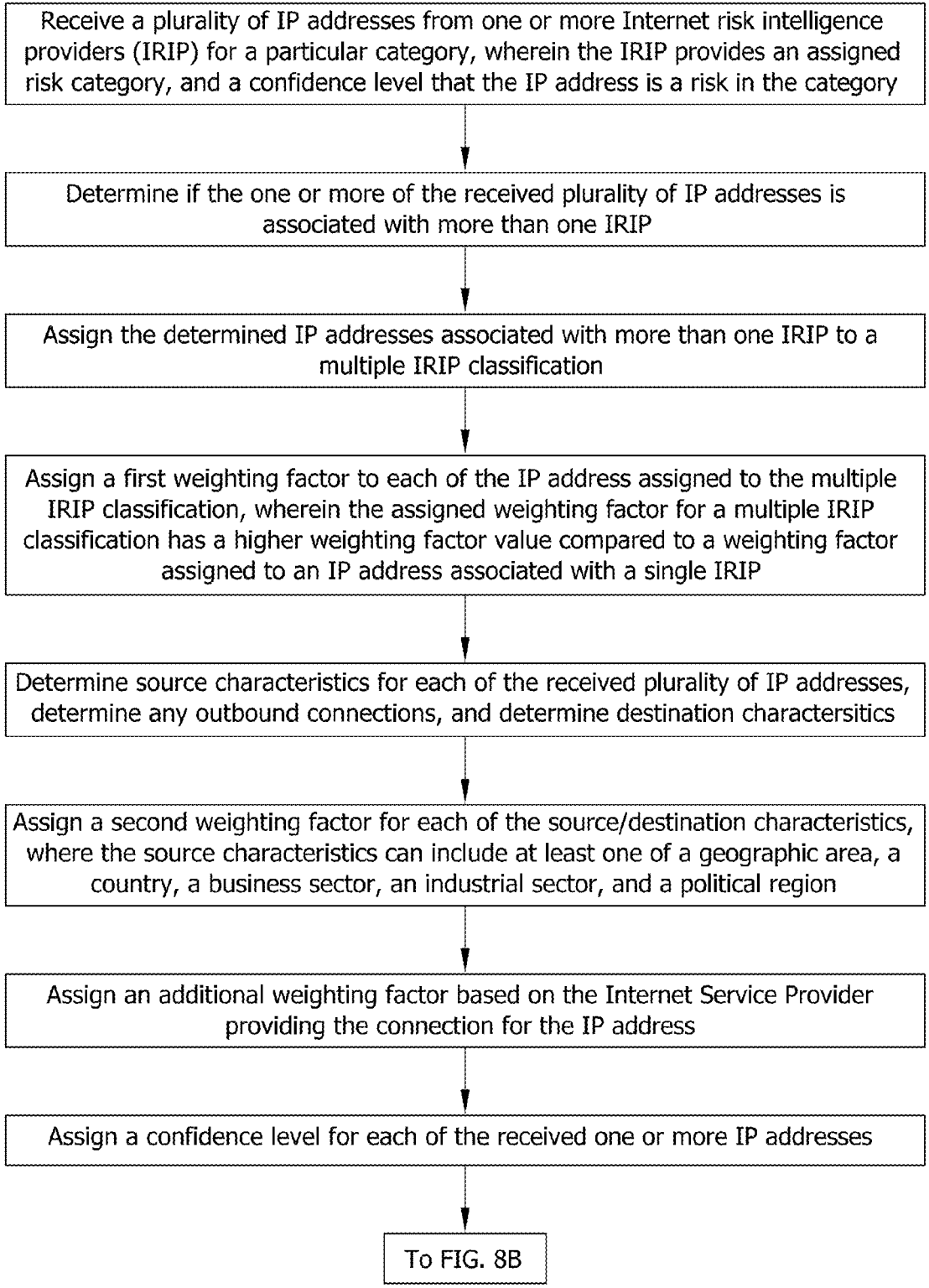
FIGS. 8A-8B is a diagram of an exemplary aggregation process in accordance with an embodiment of the invention.
Figure 8B:
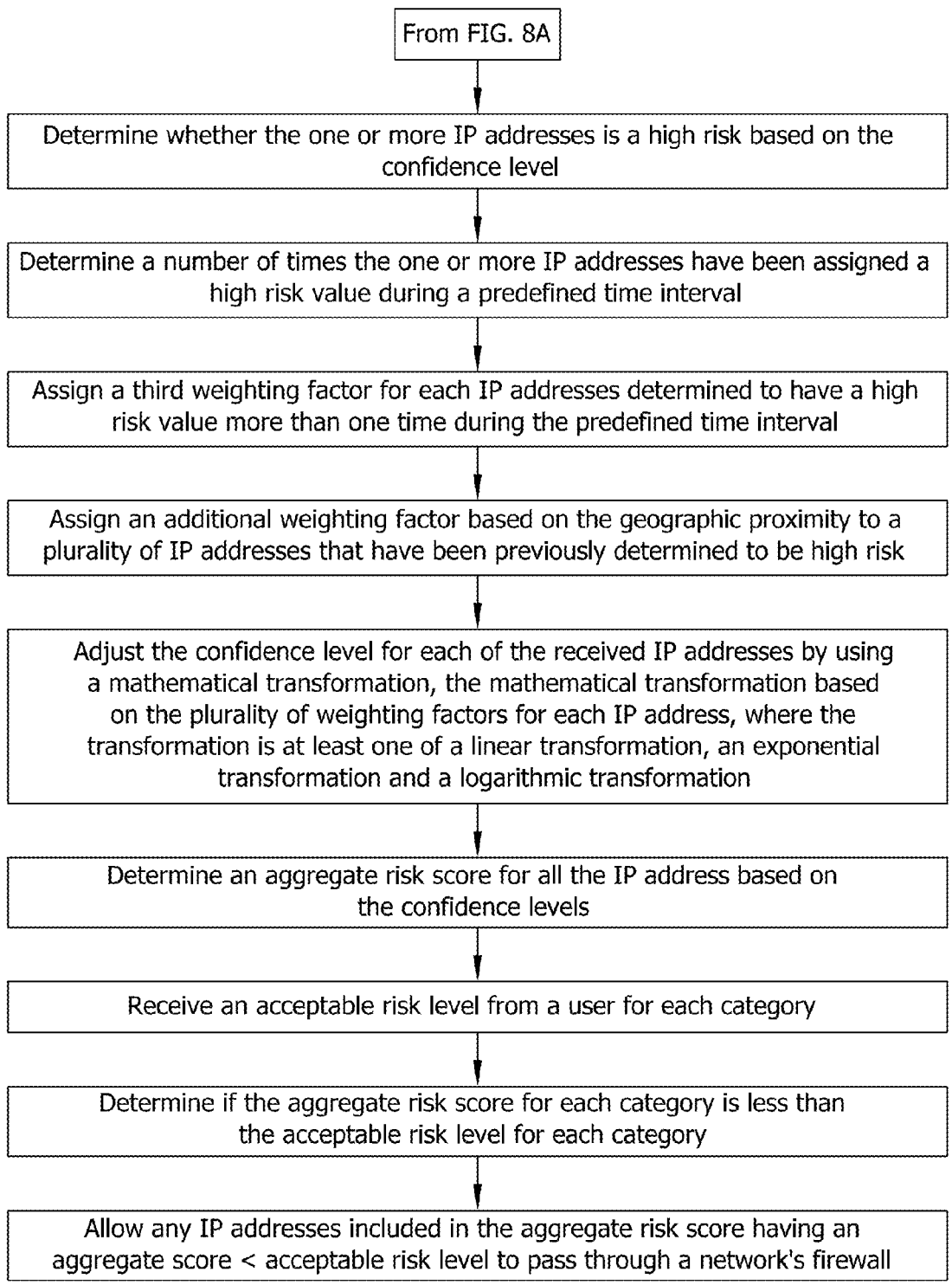

The exemplary flow diagram illustrated in FIGS. 8A and 8B shows that after the mathematical transformation, all IP addresses in a named risk category are aggregated to determine an aggregate risk score. An acceptable risk level is received and used to determine if the aggregate risk score for the category is less than the acceptable risk level for the category. Based on the aggregate risk score, aspects of the invention render a decision or otherwise determine an action. Exemplary actions include a decision to allow traffic, re-route the traffic, allow the traffic but make a record of it, etc. In one embodiment, when the aggregate risk score is less than the acceptable risk level, communications from IP addresses included in the aggregate risk score are allowed to pass through a network firewall. When the aggregate risk score is greater than or equal to the acceptable risk level, communications from IP addresses included in the aggregate risk score are not allowed to pass through a network firewall. It is to be understood that any combination of weighted risk scores can be aggregated.

Figure 9:
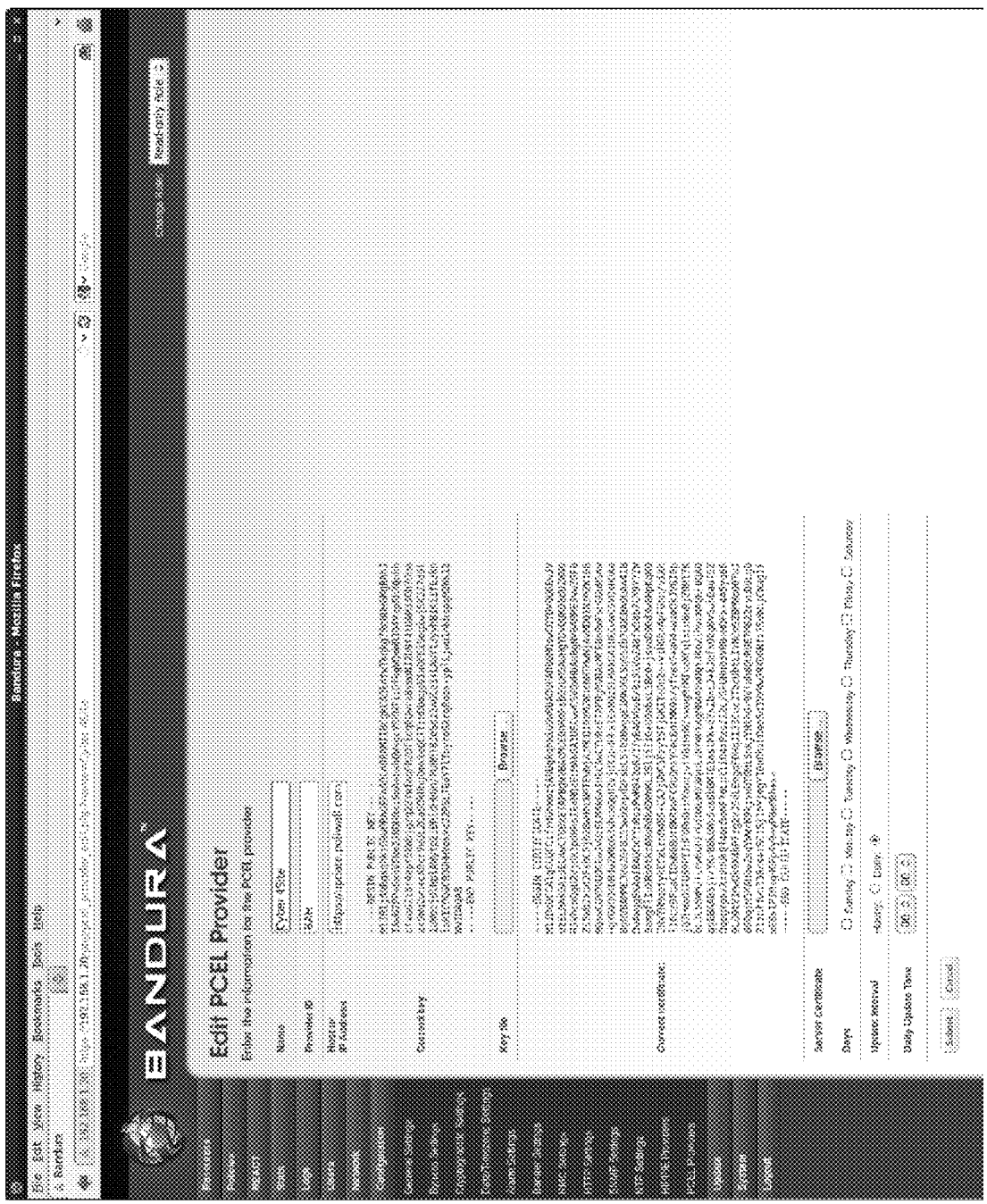
FIGS. 9-12 are screenshots of an exemplary user interface in accordance with an embodiment of the invention.

FIG. 9 illustrates an exemplary graphical user interface (GUI) in accordance with an embodiment of the invention. The user interface of FIG. 9 allows a user to enter and edit information relating to an IP threat information provider, such as an IRIP. The entering and editing of information allows IP threat information providers to be added to a list of providers from which IP threat information is acquired. Exemplary information that may be entered and/or edited includes a name of an IP threat information provider, a provider ID, a provider uniform resource locator or IP address, a cryptographic key, a security certificate, and/or IP threat information acquisition preferences.

Figure 10:
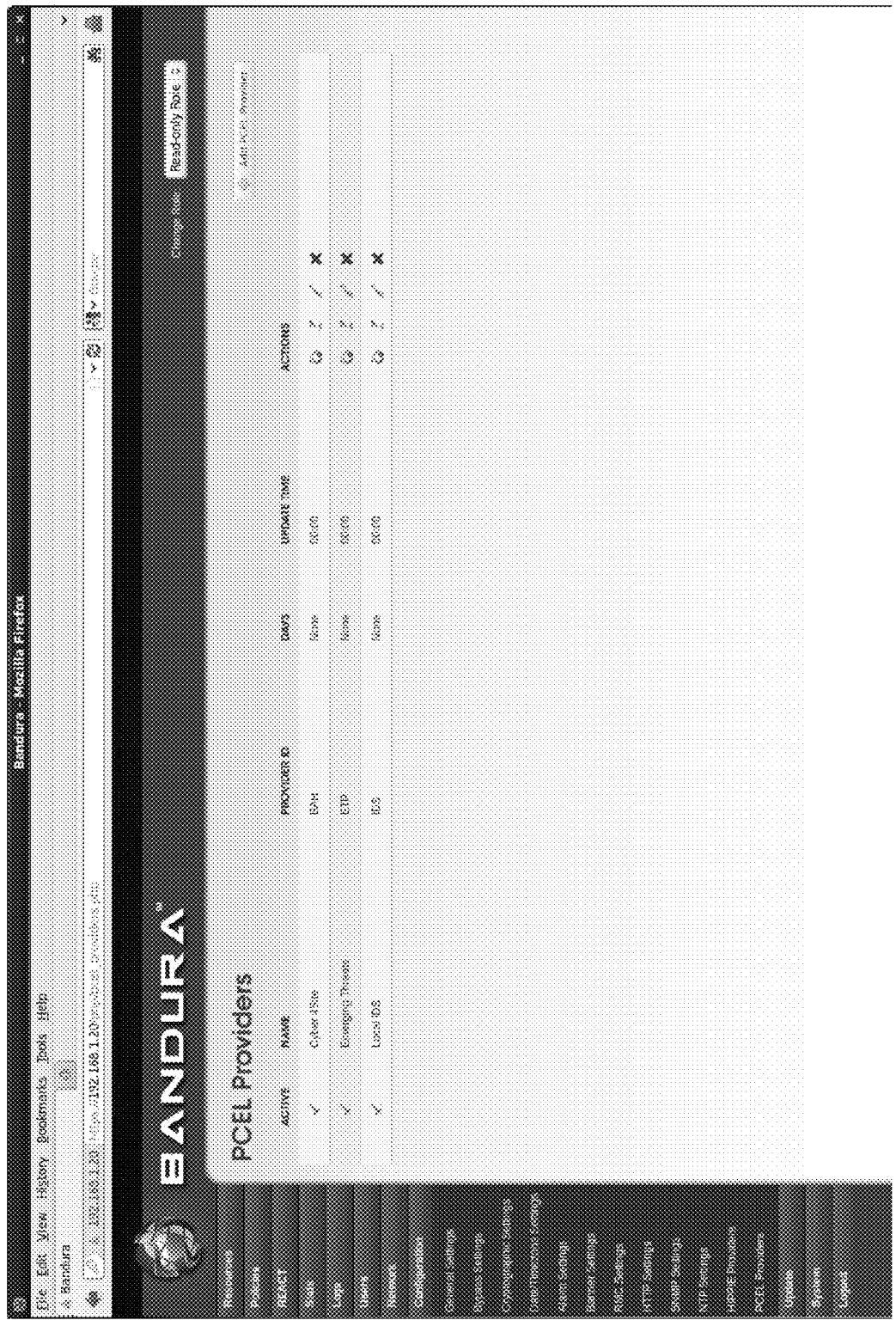

FIG. 10 illustrates an exemplary GUI in accordance with an embodiment of the invention. The user interface of FIG. 10 displays IP threat information providers for which a user has entered information. The display allows a user to quickly determine which IP threat information providers are currently being utilized and information associated with those providers. Exemplary information that may be displayed includes a provider active status, a provider name, a provider ID, and IP threat information acquisition details. The display also allows a user to enter commands to perform certain actions. Exemplary actions include activating the threat information acquired from a certain provider, editing provider information, deleting a provider, and reacquiring IP threat information from the provider.

Figure 11:
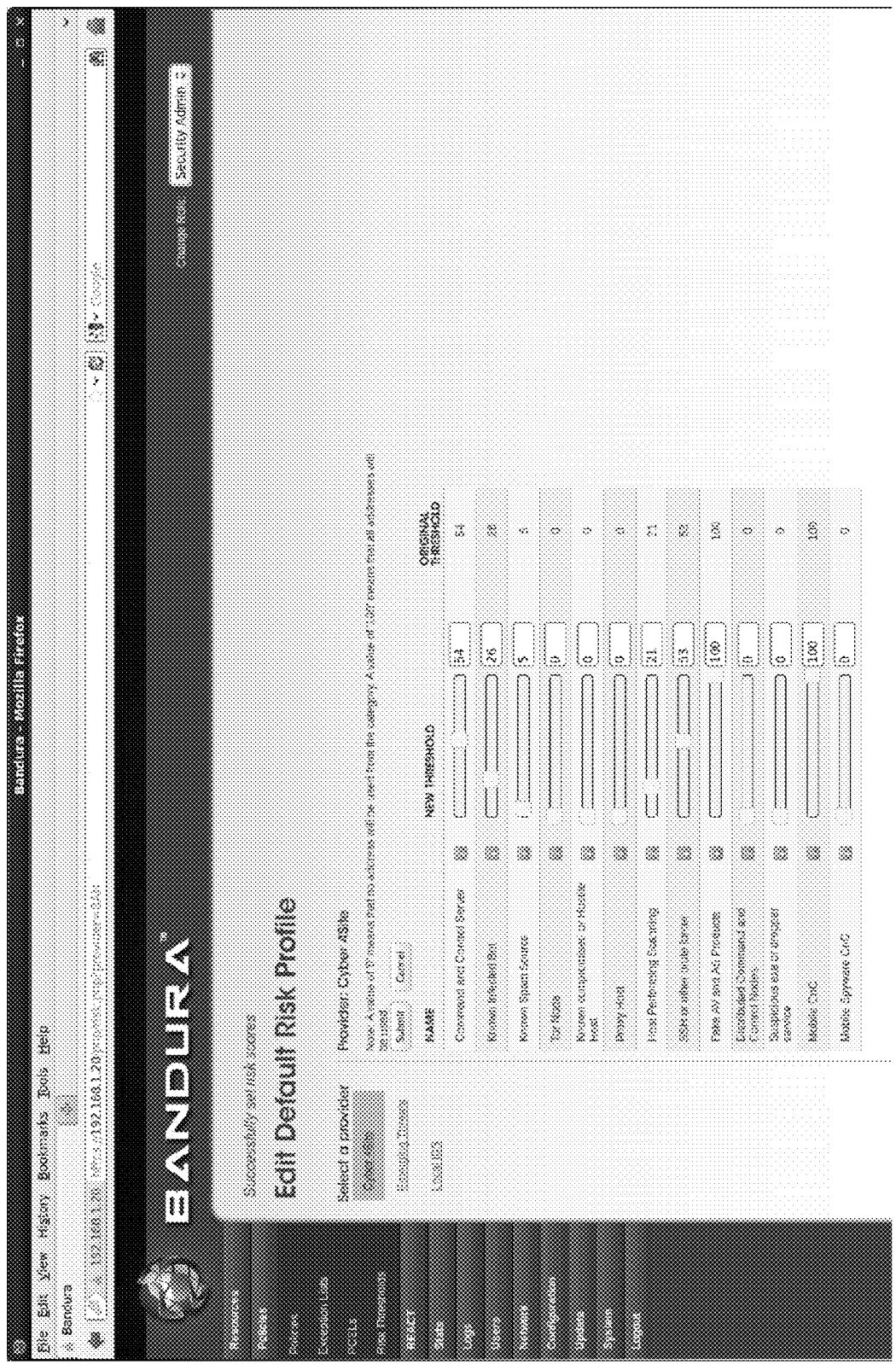
Figure 12:
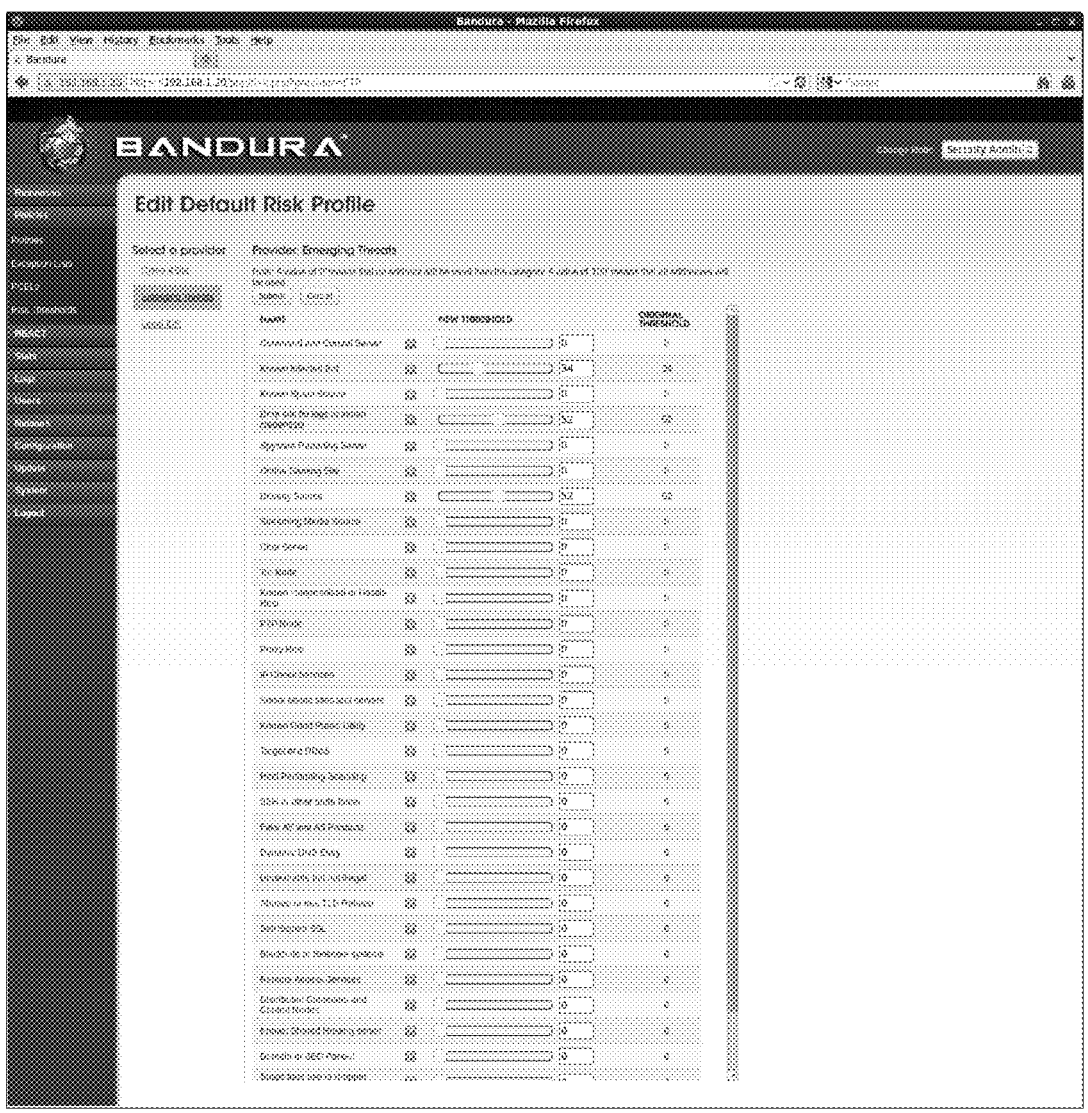

FIGS. 11 and 12 each illustrate an exemplary GUI in accordance with an embodiment of the invention. In each, GUI displays to a user a plurality of named risk categories, provides a series of "slider" input controls or the like, and provides a range of weighted values corresponding to each named risk category. In an embodiment, the user can select a particular risk category and move the slider control corresponding to that category to a particular weight value (e.g., ranging from 0 to 100) that becomes the acceptable risk level for that category. Preferably, the user is also provided a default weight value that can be used as a reference to determine if the weight value for a selected category should be increased or decreased based on a current risk assessment as provided by the IRIPs. It is contemplated that other control means could be used to input and assign the weight values, including "spinners," "gauges," text entry fields, and like input methods.

Each IRIP may use different numerical values for assigning confidence to each IP address. The numerical values are normalized before being mapped to the slider positions. The assigned weights are used in the calculation of composite scores from all IRIP data, which is then stored in RAMP engine 106.

In an embodiment, a second set of slider controls are used to set a required confidence level to block connections. For example, there is one slider for each defined category of risk. The user can set a default acceptable risk score for each category, and the user may also set unique levels for each protected resource in their network. If an IP address is stored in the RAMP engine, and the stored confidence level is greater than the value set by using the slider, the connections to/from the network resource are blocked.

Referring further to RAMP engine 106, processing each IP packet (e.g., either an IPv4 or IPv6 IP address) against the assigned risk database utilizes a high-performance look-up engine such as RAMP engine 106. The RAMP engine 106 embodying aspects of the invention is capable updates in real time with a feed of IP addresses.

To protect multiple network resources where each resource has a different risk profile, RAMP engine 106 must be able to edit a ""list"" of IP addresses stored in memory without recompilation. Storing a risk confidence score (e.g., an aggregate risk score) for each risk category allows RAMP engine 106 to be used to protect multiple network resources, with each protected resource having a different acceptable risk profile that is acceptable to the user.

Methods for sorting a plurality of IP addresses are known in the art. One known method uses Bloom filters to quickly determine whether an IP address is not stored in a data store (e.g., memory or a database). Bloom filters can be used to improve look up speeds, but a Bloom filter must be rewritten if a data entry (e.g., blocked IP address) is removed from the data store. For instance, when using a Bloom filter there is no mechanism for deleting an entry (e.g., IP address) from the data store without recompiling the entire IP address list minus the entry to be deleted. The RAMP engine 106 uses a Bloom filter, for example, to take advantage of faster access time, and include a grouping of confidence scores that are assigned to each IP address. Typically, storing both the confidence scores with each IP address would require 32-bits of storage to access 8 bits of data (for data alignment requirements), which would typically require doubling the storage requirements and also doubling the chance of a cache miss.

Aspects of the present invention speed access times by using an index to each IP address and using the same index to access a confidence score. For example, by mapping a confidence score with an IP address, the disclosed threat assessment process is able to store the data items separately allowing for better memory utilization and a higher cache hit ratio. Thus, an IP address can be effectively removed by a filtering decision based on a confidence score stored in the database, without rebuilding any data stores or recompiling. In this manner, RAMP engine 106 can store the confidence rating, use an index to map IP addresses, and in an embodiment, use a Bloom filter without recompiling an entire IP address list. When new IP addresses arrive via the real-time feed, the new IP addresses are stored in a secondary store and may be processed by the RAMP engine by the RAMP engine replacing the old data store with the secondary store, and then discarding the secondary store.

Embodiments of the present invention may comprise a special purpose or general purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices, including memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media is non-transitory and includes, but is not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embodies computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input devices (not shown), such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the invention may be embodied in data and/or computer-executable or processor-executable instructions (i.e., software), routine or function stored in system memory or non-volatile memory as application programs, program modules and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer-readable storage media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over the wide area network may be used.

Preferably, computer-executable instructions are stored in a memory, such as hard disk drive, and executed by the computer. Advantageously, the computer processor has the capability to perform all operations (e.g., execute computer-executable instructions) in real-time.

In operation, a system embodying aspects of the invention determines an aggregate risk score for a plurality of IP addresses. In doing so, the system receives a plurality of IP addresses from one or more internet risk intelligence providers (IRIPs) for a particular category, determines if the one or more received IP addresses are associated with more than one category, and determines source characteristics for each of the received IP addresses for a category. Moreover, the system assigns a weighting factor to each of the source characteristics for each category, adjusts a confidence level for each of the received IP addresses by using a mathematical transform based on the weighting factors for each category, and determines an aggregate risk score for all the IP addresses based on the adjusted confidence levels. Depending on a risk level for each category that is acceptable to the user, the system compares the aggregate risk score with the received acceptable risk level from the user and allows IP addresses having an acceptable risk level to pass through the network's firewall.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method of protecting a computer network from a computing device associated with an Internet Protocol (IP) address, the method comprising:
   acquiring a plurality of threat information from one or more internet risk intelligence providers (IRIPs) via a computer communications network;
   storing the plurality of threat information in a memory device, the threat information including the IP address, a risk category associated with the IP address, and a risk confidence level associated with the IP address;
   storing a risk category acceptance level in the memory device;
   storing a timestamp corresponding to the acquisition of the plurality of threat information in the memory device;
   determining, by a processing device coupled to the memory device, a risk category value associated with the IP address as a function of:
      the risk confidence level stored in the memory device, and
      timing information stored in the memory device, said timing information being determined based on the timestamp and comprising:
         a number of instances the risk confidence level has exceeded the risk category acceptance level during a first time interval, and
         a second time interval representing the elapsed time since the risk confidence level previously exceeded the risk category acceptance level;
   storing the risk category value in the memory device; and
   blocking, by the processing device, communications from the computing device associated with the IP address when the risk category value is equal to or greater than the risk category acceptance level.

2. The method of claim 1, further comprising receiving, by the processing device, the risk category acceptance level from a user via a graphical user interface and comparing, by the processing device, the risk category value to the risk category acceptance level, and allowing communications with the computing device associated with the IP address when the risk category value is less than the risk category acceptance level.

3. The method of claim 1, further comprising:
storing the plurality of threat information in the memory device, the threat information further including a determination of whether the IP address is acquired from more than one IRIP;
determining, by the processing device, the risk value associated with the IP address as a further function of a multiple IRIP weighting factor when the IP address is acquired from more than one IRIP, wherein the multiple IRIP weighting factor increases the risk value.

4. The method of claim 1, further comprising:
storing the plurality of threat information in the memory device, the threat information further including a determination of whether the IP address is associated with more than one risk category;
determining, by the processing device, the risk value associated with the IP address as a further function of a multiple category weighting factor when the IP address is associated with more than one risk category, wherein the multiple category weighting factor increases the risk value.

5. The method of claim 1, further comprising:
storing the plurality of threat information in the memory device, the threat information further including a determination of source characteristics and destination characteristics associated with the IP address;
determining, by the processing device, the risk value associated with the IP address as a further function of a source/destination weighting factor corresponding to the source characteristics and the destination characteristics, wherein the source/destination weighting factor increases the risk value.

6. The method of claim 5 wherein the source characteristics and the destination characteristics comprise at least one of: a geographic area, a country, a business sector, an industrial sector, and a political region.

7. The method of claim 1, further comprising:
storing the plurality of threat information in the memory device, the threat information further including a determination of Internet Service Provider (ISP) characteristics associated with the IP address;
determining, by the processing device, the risk value associated with the IP address as a further function of an ISP weighting factor corresponding to the ISP characteristics, wherein the ISP weighting factor increases the risk value.

8. The method of claim 1, further comprising:
storing the plurality of threat information in the memory device, the threat information further including a determination of geographic proximity characteristics associated with the IP address in relation to geographic proximity characteristics associated with one or more other IP addresses having risk confidence levels exceeding the threshold level;
determining, by the processing device, the risk value associated with the IP address as a further function of a geographic weighting factor corresponding to the geographic proximity characteristics associated with the IP address, wherein the geographic weighting factor increases the risk value.

9. A processor-implemented method of using an aggregate risk score for a plurality of Internet Protocol (IP) addresses to monitor communications in a computer network, the method comprising:
receiving a plurality of IP addresses from one or more internet risk intelligence providers (IRIPs) for a particular category via a computer communications network;
processing instructions for determining a plurality of source characteristics associated with each of the plurality of received IP addresses;
processing instructions for assigning one or more weighting factors to each of the plurality of source characteristics;
processing instructions for mathematically transforming each of the plurality of weighted source characteristics to adjust a risk confidence level for each of the plurality of received IP addresses, wherein the mathematical transformation is at least one of a linear transformation, an exponential transformation, and a logarithmic transformation;
processing instructions for determining an aggregate risk score for the plurality of received IP addresses as a function of the adjusted confidence levels for each of the plurality of received IP addresses, wherein the aggregate risk score is a function of a number of instances the risk confidence level for each of the received IP addresses has exceeded an acceptable level during a time interval;
storing the aggregate risk score in a memory device; and
processing instructions for allowing computer network communication with computing devices associated with each of the plurality of received IP addresses having the acceptable level of risk compared to the stored aggregate risk score.

10. The method of claim 9, further comprising:
processing instructions for determining whether each of the plurality of received IP addresses is received from more than one IRIP; and
processing instructions for assigning one or more additional weighting factors to each of the plurality of received IP addresses received from more than one IRIP.

11. The method of claim 9, wherein at least one of the source characteristics comprises a source/destination characteristic associated with each of the plurality of received IP addresses and further comprising processing instructions for determining a risk value associated with each of the received IP addresses as a function of a source/destination weighting factor corresponding to the source/destination characteristic, wherein the source/destination weighting factor increases the risk value.

12. The method of claim 11 wherein the source/destination characteristic comprises at least one of: a geographic area, a country, a business sector, an industrial sector, and a political region.

13. The method of claim 9, wherein at least one of the source characteristics comprises an Internet Service Provider (ISP) characteristic associated with each of the plurality of received IP addresses and further comprising processing instructions for determining a risk value associated with each of the received IP addresses as a function of an ISP weighting factor corresponding to the ISP characteristic, wherein the ISP weighting factor increases the risk value.

14. The method of claim 9, further comprising processing instructions for generating a graphical user interface (GUI) for displaying a plurality of risk categories associated with the plurality of IP addresses and for receiving input from a user, the input including a risk acceptance level for each of the plurality of risk categories.

15. A system for protecting a network from a security threat in real-time, the system comprising:
a memory for storing the plurality of Internet Protocol (IP) addresses, a timestamp associated with each of the plurality of IP addresses, a risk category associated with each of the plurality of IP addresses, and a risk confidence level associated with each of the plurality of IP addresses;
a graphical user interface (GUI) for displaying a plurality of risk categories associated with the plurality of IP addresses on a display, and for receiving input from a user, the input including a risk acceptance level for each of the plurality of risk categories;
a non-transitory computer-readable storage media having stored thereon computer processor-executable instructions;
a computer processor for executing the computer-executable instructions, said instructions comprising:
receiving a plurality of IP addresses associated with a particular risk category from one or more internet risk intelligence providers (IRIPs);
determining if the one or more received IP addresses are associated with more than one risk category;
determining source characteristics for each of the received IP addresses for a category;
assigning a weighting factor to each of the source characteristics for each category;
adjusting a confidence level for each of the received IP addresses by using a mathematical transform based on the weighting factors for each category;
determining an aggregate risk score for all the IP addresses based on the adjusted confidence levels;
storing the aggregate risk score in a memory device;
receiving an acceptable risk level from a user for each category, wherein the aggregate risk score is a function of a number of instances the risk confidence level for each of the received IP addresses has exceeded the acceptable risk level during a time interval based on the timestamp associated therewith;
comparing the stored aggregate risk score with the received acceptable risk level from the user; and
allowing communications from any IP addresses having an acceptable risk level to pass through the network's firewall.

16. The system of claim 15, wherein at least one of the source characteristics comprises a source/destination characteristic associated with each of the plurality of received IP addresses and wherein the computer-executable instructions comprise determining a risk value associated with each of the received IP addresses as a function of a source/destination weighting factor corresponding to the source/destination characteristic, wherein the source/destination weighting factor increases the risk value.

17. The system of claim 15, wherein at least one of the source characteristics comprises an Internet Service Provider (ISP) characteristic associated with each of the plurality of received IP addresses and wherein the computer-executable instructions comprise determining a risk value associated with each of the received IP addresses as a function of an ISP weighting factor corresponding to the ISP characteristic, wherein the ISP weighting factor increases the risk value.

18. A computer network firewall system, comprising:
at least one tangible, non-transitory a computer-readable medium storing processor-executable instructions;
a threat assessment processor programmed to execute the instructions, wherein the instructions, when executed by the processor:
acquire a plurality of threat information from one or more internet risk intelligence providers (IRIPs) via a computer communications network;
store the plurality of threat information on the computer-readable medium, the threat information including an IP address, a risk category associated with the IP address, and a risk confidence level associated with the IP address;
store a risk acceptance level;
store a timestamp corresponding to the acquisition of the plurality of threat information on the computer-readable medium;
determine a risk value associated with the IP address as a function of:
the risk confidence level,
a number of instances the risk confidence level has exceeded a threshold level during a first time interval, and
a second time interval representing the elapsed time since the risk confidence level previously exceeded the threshold level;
compare the risk value with the risk acceptance level; and
block computer network communications with a computing device associated with the IP address when the risk value is greater than or equal to the risk acceptance level.

19. A computer network firewall system, comprising:
at least one tangible, non-transitory a computer-readable medium storing processor-executable instructions;
a threat assessment processor programmed to execute the instructions, wherein the instructions, when executed by the processor:
store a plurality of threat information on the computer-readable medium, the threat information including an IP address, a risk category associated with the IP address, a risk confidence level associated with the IP address, and a determination of geographic proximity characteristics associated with the IP address in relation to geographic proximity characteristics associated with one or more other IP addresses having risk confidence levels exceeding a threshold level;
store a risk acceptance level;
determine a risk value associated with the IP address as a function of:
the risk confidence level,
a number of instances the risk confidence level has exceeded the threshold level during a first time interval,
a second time interval representing the elapsed time since the risk confidence level previously exceeded the threshold level, and
a geographic weighting factor corresponding to the geographic proximity characteristics associated with the IP address, wherein the geographic weighting factor increases the risk value;
compare the risk value with the risk acceptance level; and
block computer network communications with a computing device associated with the IP address when the risk value is greater than or equal to the risk acceptance level.

* * * * *